(12) United States Patent
Matsumoto

(10) Patent No.: US 8,922,817 B2
(45) Date of Patent: Dec. 30, 2014

(54) MOBILE PRINTING DEVICE

(71) Applicant: Pita4 Mobile LLC, Palo Alto, CA (US)

(72) Inventor: Kazuhiko Matsumoto, Palo Alto, CA (US)

(73) Assignee: Pita4 Mobile LLC, Palo Alto, CA (US)

( * ) Notice: Subject to any disclaimer, the term of this patent is extended or adjusted under 35 U.S.C. 154(b) by 69 days.

(21) Appl. No.: 13/848,918

(22) Filed: Mar. 22, 2013

(65) Prior Publication Data

US 2014/0285825 A1  Sep. 25, 2014

(51) Int. Cl.
*G06K 15/02* (2006.01)
*H04N 1/00* (2006.01)

(52) U.S. Cl.
CPC .......... *G06K 15/021* (2013.01); *H04N 1/00278* (2013.01)
USPC .............................. 358/1.15; 358/1.3; 358/1.5

(58) Field of Classification Search
CPC ........ G06F 3/1292; G06F 3/1285; B41J 3/36; B41J 3/28; B41J 11/008; H04N 1/10; B65H 2555/32; B41F 15/0859
USPC ........... 358/1.1, 1.3, 1.5, 1.15, 400, 401, 474, 358/494, 497; 347/109
See application file for complete search history.

(56) References Cited

U.S. PATENT DOCUMENTS 6,709,085 B2 * 3/2004 Hoshino et al. .................. 347/19
6,729,706 B1 * 5/2004 Patton et al. ...................... 347/2

FOREIGN PATENT DOCUMENTS

JP        2003291420 A  * 10/2003
JP        2008068513 A  *  3/2008
WO   WO 2007012802 A1 *  2/2007

* cited by examiner

*Primary Examiner* — Thomas D Lee
(74) *Attorney, Agent, or Firm* — Gard & Kaslow LLP

(57) ABSTRACT

A self-propelled printing apparatus to perform printing on an object to be printed includes a moving unit that moves the self-propelled printing apparatus on the object to be printed and a printing unit that performs printing on the object to be printed on the basis of print processing data generated based on information of a position to which the self-propelled printing apparatus has been moved by the moving unit.

26 Claims, 15 Drawing Sheets

MOBILE PRINTING DEVICE

BACKGROUND OF THE INVENTION

1. Field of the Invention

The present invention relates to a self-propelled printing apparatus, a printing system, and a printing method and in particular, to a self-propelled printing apparatus that moves on an object to be printed to perform printing on the object to be printed, a printing system including the self-propelled printing apparatus, a printing method using the self-propelled printing apparatus, and a printing program for using the self-propelled printing apparatus.

2. Background Art

In the related art, when printing data such as images or text, a stationary printing apparatus is generally used. On the other hand, in response to a desire to perform printing outside, a portable printing apparatus that is designed compact and lightweight so as to be able to be carried has also been developed.

As an example of such a portable printing apparatus, the invention disclosed in JP-A-2007-129783 may be mentioned. The invention disclosed in JP-A-2007-129783 is to set printing paper having a specified size in a printing apparatus and perform printing continuously on the printing paper.

Therefore, since a width of the extent to which at least printing paper can be inserted is required in such a printing apparatus, there has been a limitation in miniaturization.

On the other hand, the invention disclosed in JP-T-2005-517553 is to perform printing on printing paper while moving the printing apparatus itself with respect to the printing paper. Such a printing apparatus can perform printing on printing paper of any size.

In the invention disclosed in JP-T-2005-517553, however, since the movement of the printing apparatus and printing on printing paper are performed simultaneously and continuously, the accuracy of printing could not be expected. In addition, the apparatus does not recognize which portion of the object is being printed, printing data fixed in advance is used as it is, and positioning is left to human hands and the apparatus expects that it would be accurate. For this reason, the result was inaccurate and the printing quality was low.

Therefore, a portable printing apparatus that is designed compact and lightweight and can also perform printing without degrading the quality, such as the accuracy of printing, has been in demand.

SUMMARY OF THE INVENTION

It is an object of the invention to provide a printing apparatus capable of moving on an object to be printed to perform printing on the object to be printed without degrading the quality of printing, a printing system including the self-propelled printing apparatus, a printing method using the self-propelled printing apparatus, and a printing program for using the self-propelled printing apparatus.

According to an aspect of the invention, there is provided a self-propelled printing apparatus to perform printing on an object to be printed. The self-propelled printing apparatus includes: a moving unit that moves the self-propelled printing apparatus on the object to be printed; and a printing unit that performs printing on the object to be printed on the basis of print processing data generated based on information of a position to which the self-propelled printing apparatus has been moved by the moving unit.

The position information may be obtained by analyzing an image captured by an imaging element.

The imaging element may image a position information pattern fixed on the object to be printed.

The imaging element may image a position information pattern projected by one or more projection means.

The position information pattern may be projected onto the object to be printed.

The self-propelled printing apparatus may further include an indicator that indicates a range to be printed, and the imaging element may image the position information pattern and the indicator.

The self-propelled printing apparatus may further include a screen unit onto which the position information pattern is projected, and the imaging element may image the position information pattern projected onto the screen unit.

The indicator may be integrated in the screen unit.

The position information pattern may be a grid-like pattern.

The self-propelled printing apparatus may further include: an imaging unit in which the imaging element is provided; a position analysis unit that analyzes the information of a position to which the self-propelled printing apparatus has been moved by the moving unit; and a print processing data generation unit that generates the print processing data on the basis of an analysis result of the position analysis unit.

The imaging element may be provided in a digital camera that can be attached to and detached from the self-propelled printing apparatus, and the self-propelled printing apparatus may further include: a position analysis unit that analyzes the information of a position to which the self-propelled printing apparatus has been moved by the moving unit; and a print processing data generation unit that generates the print processing data on the basis of an analysis result of the position analysis unit.

The imaging element may be provided in a mobile device that can be attached to and detached from the self-propelled printing apparatus, and the print processing data may be generated on the basis of an analysis result of a position of the self-propelled printing apparatus on the object to be printed by the mobile device using an image captured by the imaging element. The self-propelled printing apparatus may further include an optical sensor that detects light of a position information pattern projected by one or more projection means, and the position information may be obtained by analyzing the light detection result of the optical sensor.

The position information pattern may be a time-varying pattern depending on a location.

The position information pattern may be a pattern of light having different characteristics depending on a location.

When the position information pattern projected by the projection means is distorted, the print processing data may be generated with the correction of the distortion.

The position information may be obtained using a magnetic method or an electromagnetic method.

The position information may be obtained using a surveying method.

The self-propelled printing apparatus may further include a radio wave detection unit that detects radio waves emitted from a plurality of reference positions, and the position information may be obtained by analyzing the radio wave detection result of the radio wave detection unit.

The self-propelled printing apparatus may further include an ultrasonic wave detection unit that detects ultrasonic waves emitted from a plurality of reference positions, and the position information may be obtained by analyzing the ultrasonic wave detection result of the ultrasonic wave detection unit.

The self-propelled printing apparatus may further have a function of scanning the object to be printed.

According to another aspect of the invention, there is provided a printing system to perform printing on an object to be printed. The printing system includes: a moving unit that moves a self-propelled printing apparatus on the object to be printed; a position analysis unit that analyzes information of a position to which the self-propelled printing apparatus has been moved by the moving unit; a print processing data generation unit that generates print processing data on the basis of an analysis result of the position analysis unit; and a printing unit that performs printing on the object to be printed on the basis of the print processing data generated by the print processing data generation unit.

According to still another aspect of the invention, there is provided a printing method for performing printing on an object to be printed. The printing method includes: a movement step of moving a self-propelled printing apparatus on the object to be printed; a position analysis step of analyzing information of a position to which the self-propelled printing apparatus has been moved in the movement step; a print processing data generation step of generating print processing data on the basis of an analysis result in the position analysis step; and a printing step of performing printing on the object to be printed on the basis of the print processing data generated in the print processing data generation step.

According to still another aspect of the invention, there is provided a printing program for performing printing on an object to be printed. The printing program causes a computer to realize: a movement function of moving a self-propelled printing apparatus on the object to be printed; a position analysis function of analyzing information of a position to which the self-propelled printing apparatus has been moved by the movement function; a print processing data generation function of generating print processing data on the basis of an analysis result by the position analysis function; and a printing function of performing printing on the object to be printed on the basis of the print processing data generated by the print processing data generation function.

According to the self-propelled printing apparatus, the printing system, the printing method, and the printing program of the invention, it is possible to move on an object to be printed to perform printing intermittently on the object to be printed without degrading the quality of printing.

DETAILED DESCRIPTION OF THE INVENTION

Hereinafter, embodiments of a self-propelled printing apparatus of the invention will be described with reference to the accompanying drawings.

Figure 1:
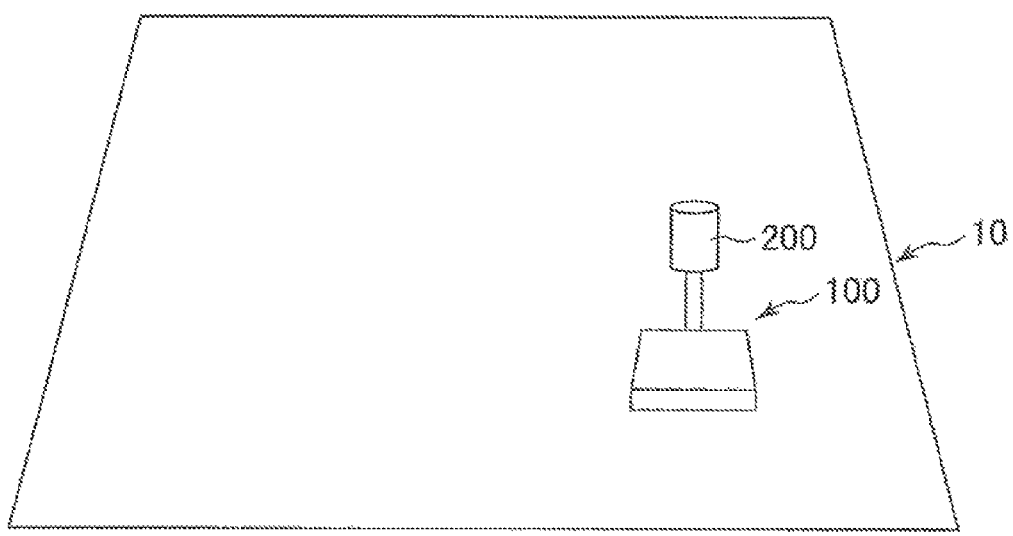
FIG. 1 is a schematic diagram of a self-propelled printing apparatus of the invention on an object to be printed.
Figure 2:
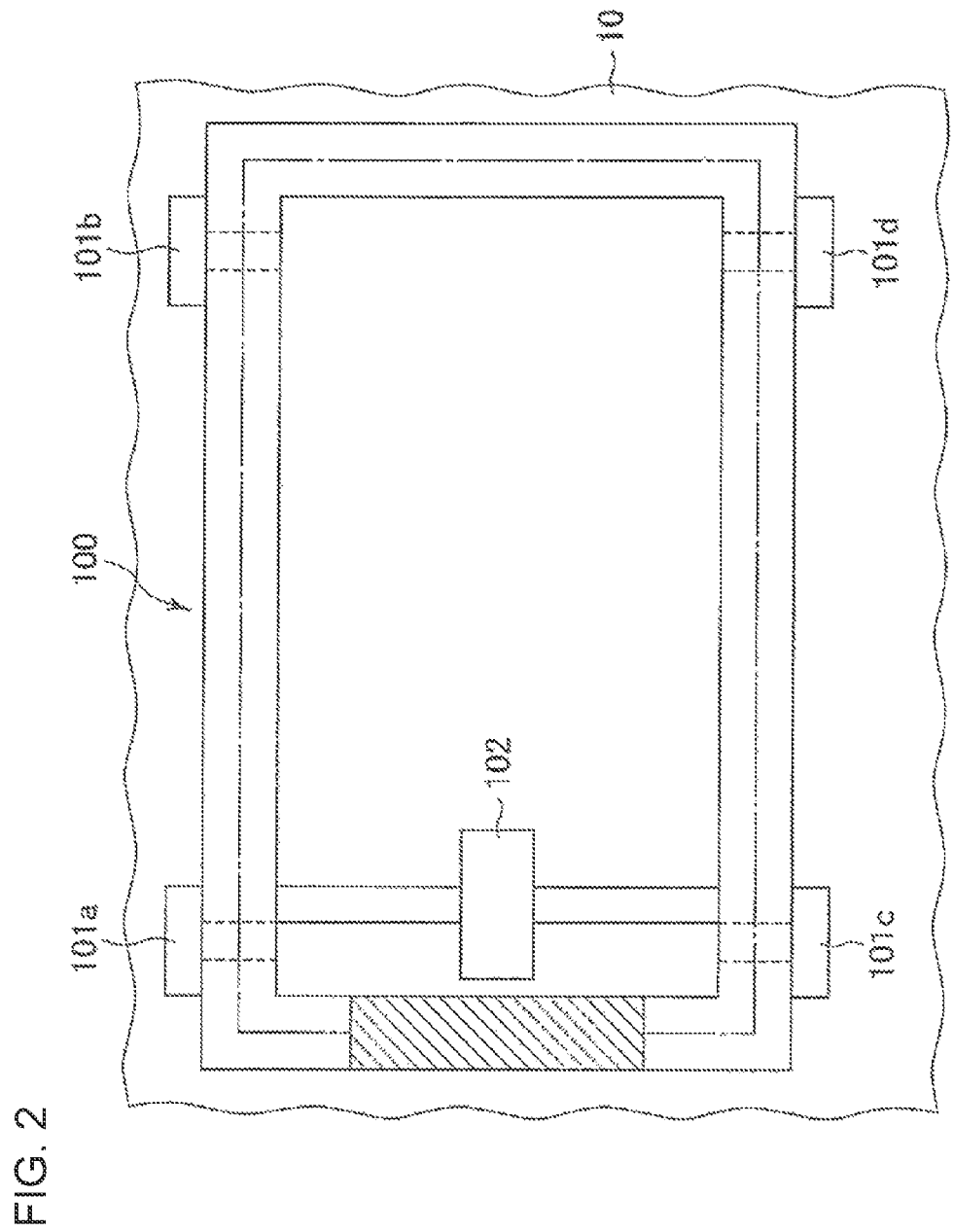
FIG. 2 is a bottom view of the self-propelled printing apparatus of the invention.

A self-propelled printing apparatus 100 of the invention is a self-propelled printing apparatus to perform printing on an object to be printed 10, as shown in FIG. 1 as an example. FIG. 2 is a bottom view of the self-propelled printing apparatus 100, and the self-propelled printing apparatus 100 includes a moving unit 101 (in FIG. 1, four wheels 101a to 101d) that moves the self-propelled printing apparatus 100 on the object to be printed 10 and a printing unit 102 that performs printing on the object to be printed on the basis of print processing data generated based on the information of a position to which the self-propelled printing apparatus 100 has been moved by the moving unit 101.

Figure 3:
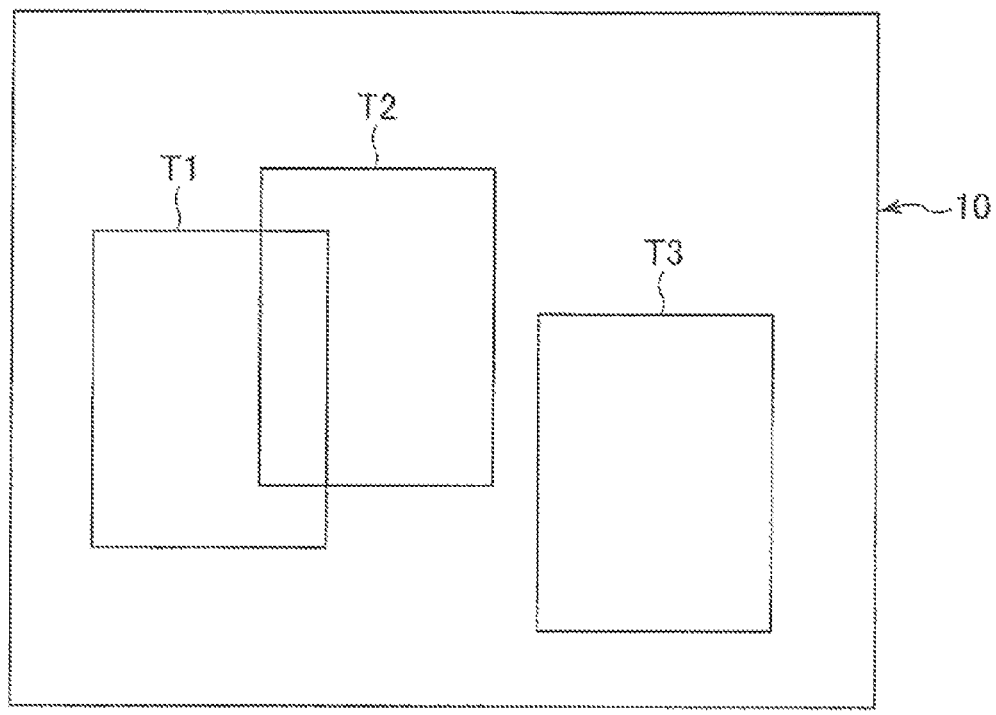
FIG. 3 is a diagram showing the movement position of the self-propelled printing apparatus of the invention.

FIG. 3 is a diagram showing an example of the movement position of the self-propelled printing apparatus 100 on the object to be printed 10. When the self-propelled printing apparatus 100 is moved from a position T1 to a position T2 by the moving unit 101, the printing unit 102 performs printing at the position T2 of the object to be printed on the basis of print processing data generated based on the information of the position T2. Then, when the self-propelled printing apparatus 100 is moved from the position T2 to a position T3 by the moving unit 101, the printing unit 102 performs printing at the position T3 of the object to be printed on the basis of print processing data generated based on the information of the position T3. The self-propelled printing apparatus 100 performs printing on the object to be printed 10 by repeating such movement. That is, the self-propelled printing apparatus 100 of the invention moves on the object to be printed to perform printing intermittently on the object to be printed.

In the self-propelled printing apparatus 100 of the invention, high accuracy is not required for the movement itself. Wherever the self-propelled printing apparatus 100 is moved to a position by the moving unit 101, print processing data that should be printed at the position is generated. In addition, since the print processing data to be printed is printed correctly at each position to which the self-propelled printing apparatus 100 has moved, data to be printed is printed correctly on the entire object to be printed.

Therefore, since at least the structure of the moving unit can be simplified in the self-propelled printing apparatus 100 of the invention, it is possible to perform high-quality printing while meeting the demands of reduction in size and weight. In addition, it is possible to reduce the manufacturing cost due to the simplification of the structure.

The information of the position to which the self-propelled printing apparatus 100 has moved may be obtained by analyzing an image captured by an imaging element 200 shown in FIG. 1. That is, print processing data is generated using an analysis result of an image captured by the imaging element.

The imaging element may image a position information pattern fixed on the object to be printed. Examples of the position information pattern fixed on the object to be printed include a position information pattern printed on the object to be printed in advance or a position information pattern expressed in irregularities on the object to be printed. In addition, it is possible to place the position information pattern on a table having a built-in light source and place an object to be printed on the table so that the position information pattern is transmitted through the object to be printed.

Figure 4A:
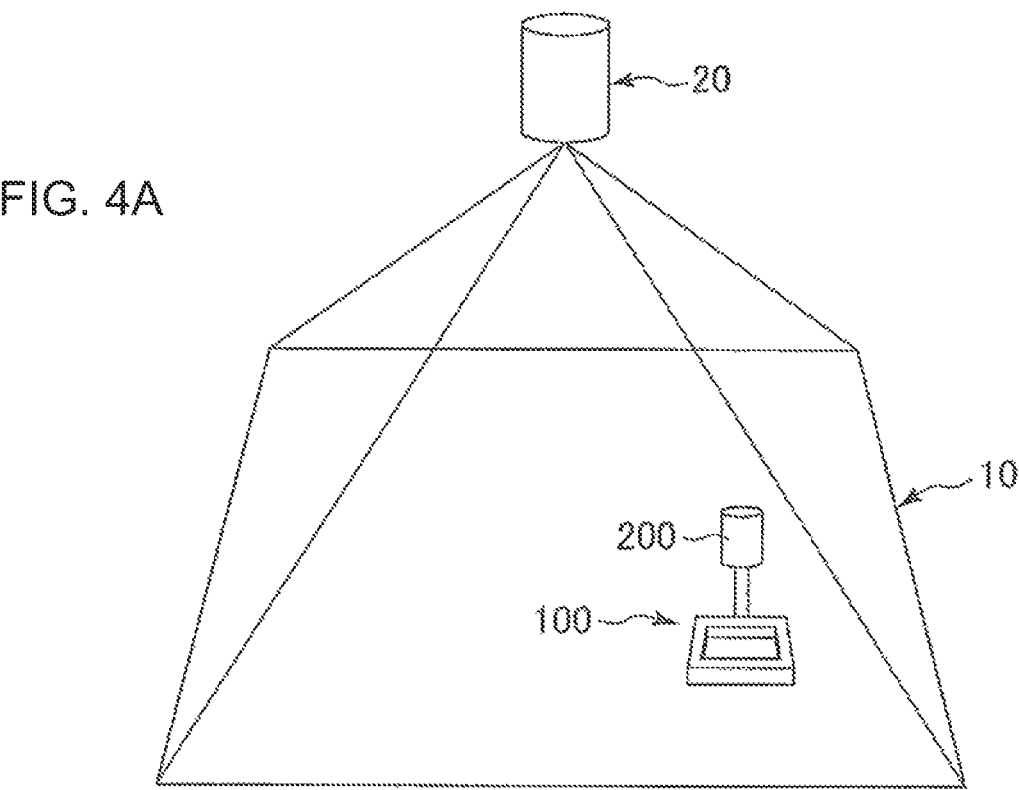
FIGS. 4A and 4B are diagrams showing examples of the self-propelled printing apparatus of the invention.

In addition, as shown in FIG. 4A, an imaging element may image a position information pattern projected by one or more projection means 20. A projector or the like may be mentioned as the projection means.

In addition, the imaging element 200 may image the position information pattern projected onto the object to be printed 10.

Figure 5:
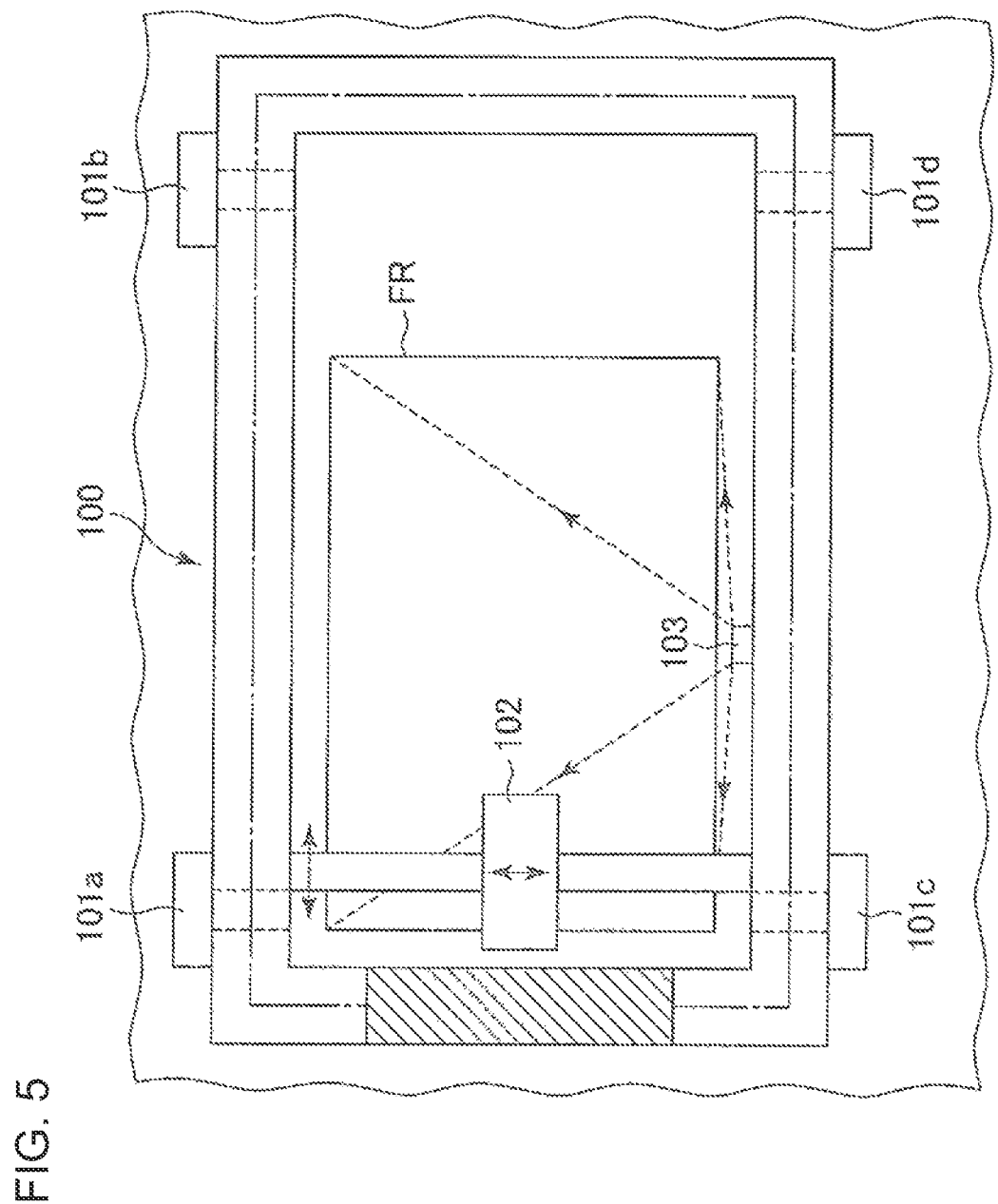
FIG. 5 is a bottom view of the self-propelled printing apparatus of the invention.

In addition, it is preferable that the self-propelled printing apparatus 100 further include an indicator that indicates a range to be printed FR and that the imaging element 200 image the position information pattern and the indicator. The indicator that indicates the range to be printed FR may be a rod or wire frame or may be a laser beam or the like projected from an indicator projection unit 103 of the printing apparatus as shown in FIG. 5. By imaging the indicator and the position information pattern simultaneously, even if the imaging position of the imaging element 200 is not accurately specified, data to be printed can be printed correctly, for the range to be printed FR included in the image, from an image captured by the imaging element 200.

Figure 4B:
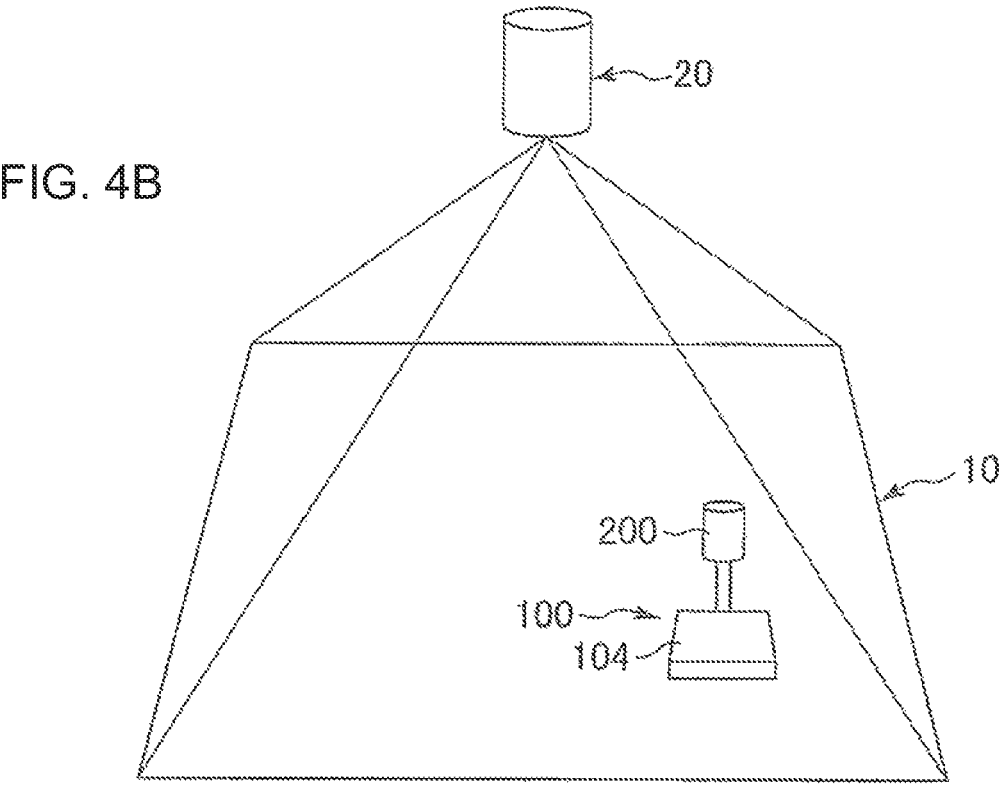

In addition, as shown in FIG. 4B, it is preferable that the self-propelled printing apparatus 100 further include a screen unit 104 onto which the position information pattern is projected and that the imaging element 200 image the position information pattern projected onto the screen unit 104.

The shape of the screen unit 104 may be a plate shape or a rod shape, and is not particularly limited as long as a part of the position information pattern is projected.

Figure 6:
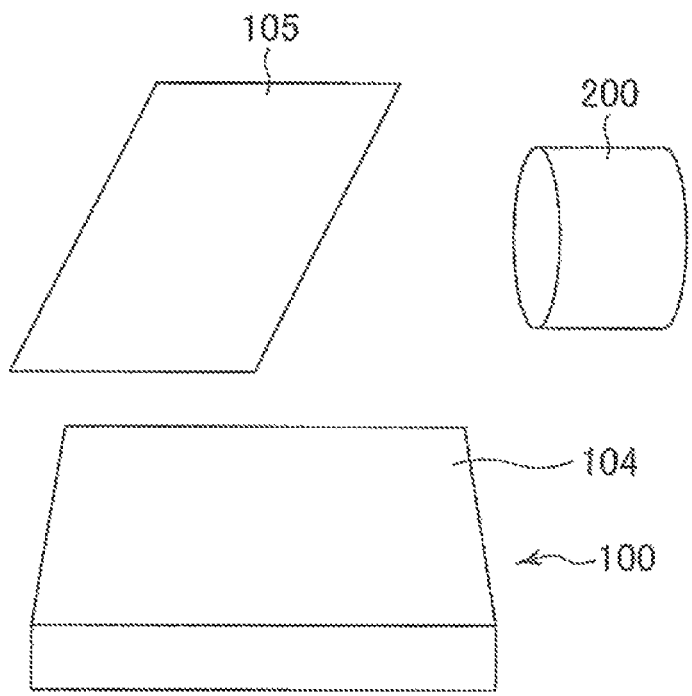
FIG. 6 is a diagram showing an example of the self-propelled printing apparatus of the invention.

In addition, as shown in FIG. 6, it is preferable that the self-propelled printing apparatus 100 further include a mirror unit 105 and the imaging element 200 image a position information pattern through the mirror unit 105. By adopting such a configuration, the arrangement direction or position of the imaging element 200 can be freely set. In addition, this mirror unit 105 may be an optical component, such as a lens or a prism. In addition, although FIG. 6 shows a case where the mirror unit 105 reflects the position information pattern projected onto the screen unit 104, it is also possible to dispose the mirror unit 105 in the configuration shown in FIG. 4A so that a fixed or printed position information pattern on the object to be printed 10 is reflected.

In addition, the above-described indicator may also be integrated in the screen unit 104.

Figure 7:
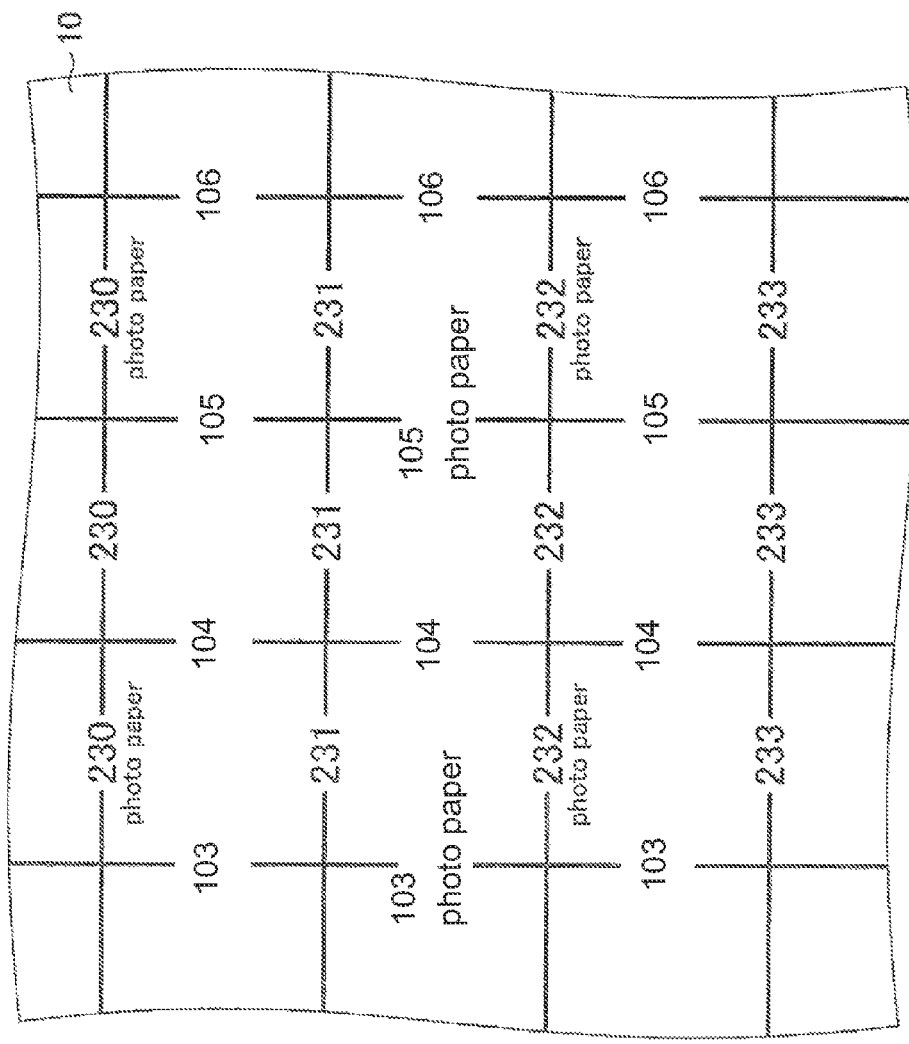
FIG. 7 is a diagram showing an example of the position information pattern of the invention.

In addition, as shown in FIG. 7, the position information pattern may be a grid-like pattern. Addresses indicating the position on the object to be printed are set in the grid-like pattern. In addition, quality data indicating the quality of the object to be printed (FIG. 7 illustrates that the object to be printed 10 is "photo paper" for photo printing) may be set.

Figure 8:
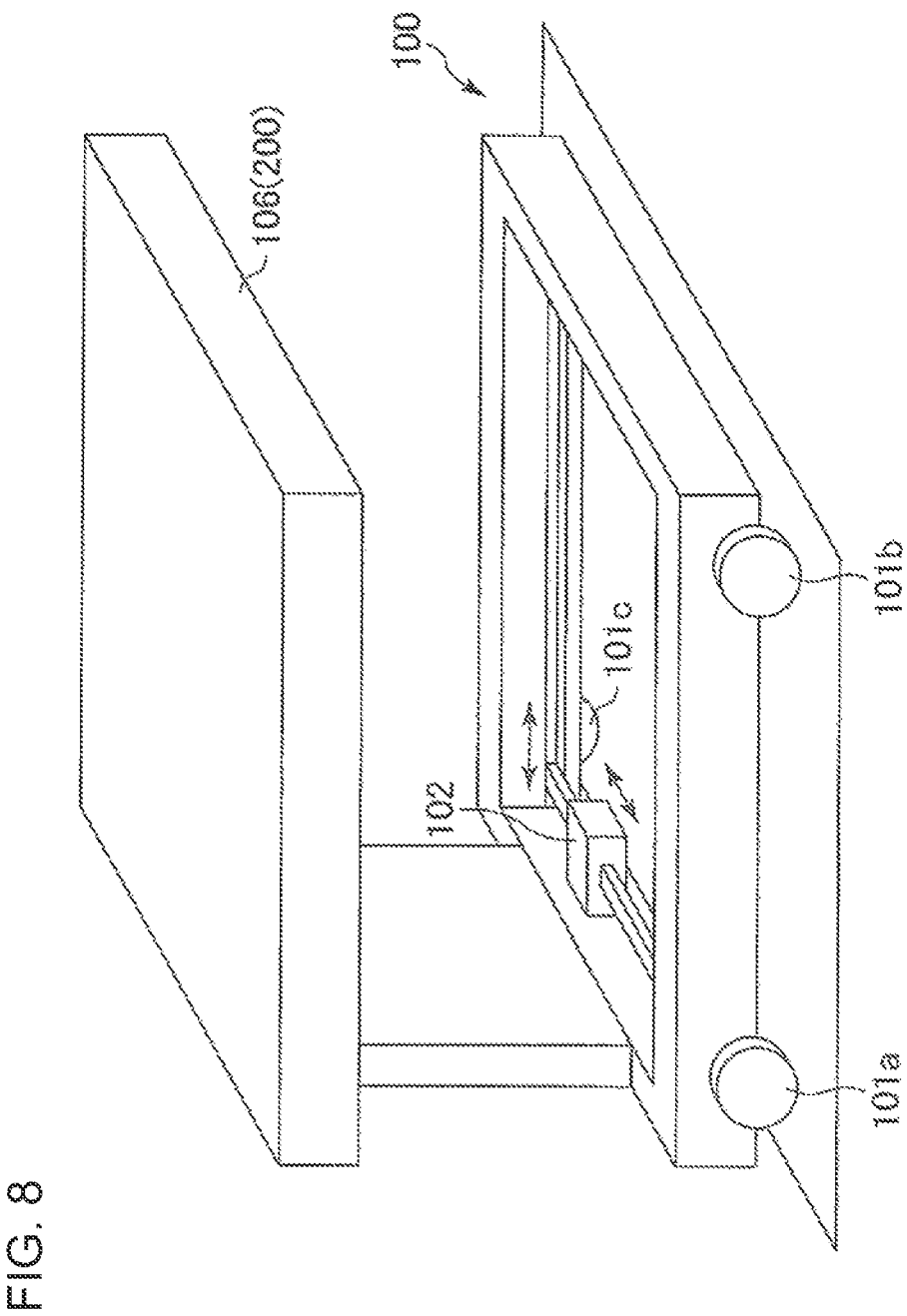
FIG. 8 is a schematic diagram of a self-propelled printing apparatus of a first embodiment of the invention.

In a first embodiment of the invention, as shown in FIG. 8, it is preferable that the self-propelled printing apparatus 100 further include an imaging unit 106 in which the imaging element 200 is provided, a position analysis unit that analyzes the information of a position to which the self-propelled printing apparatus 100 has been moved by the moving unit 101, and a print processing data generation unit that generates the print processing data on the basis of the analysis result of the position analysis unit.

Figure 9:
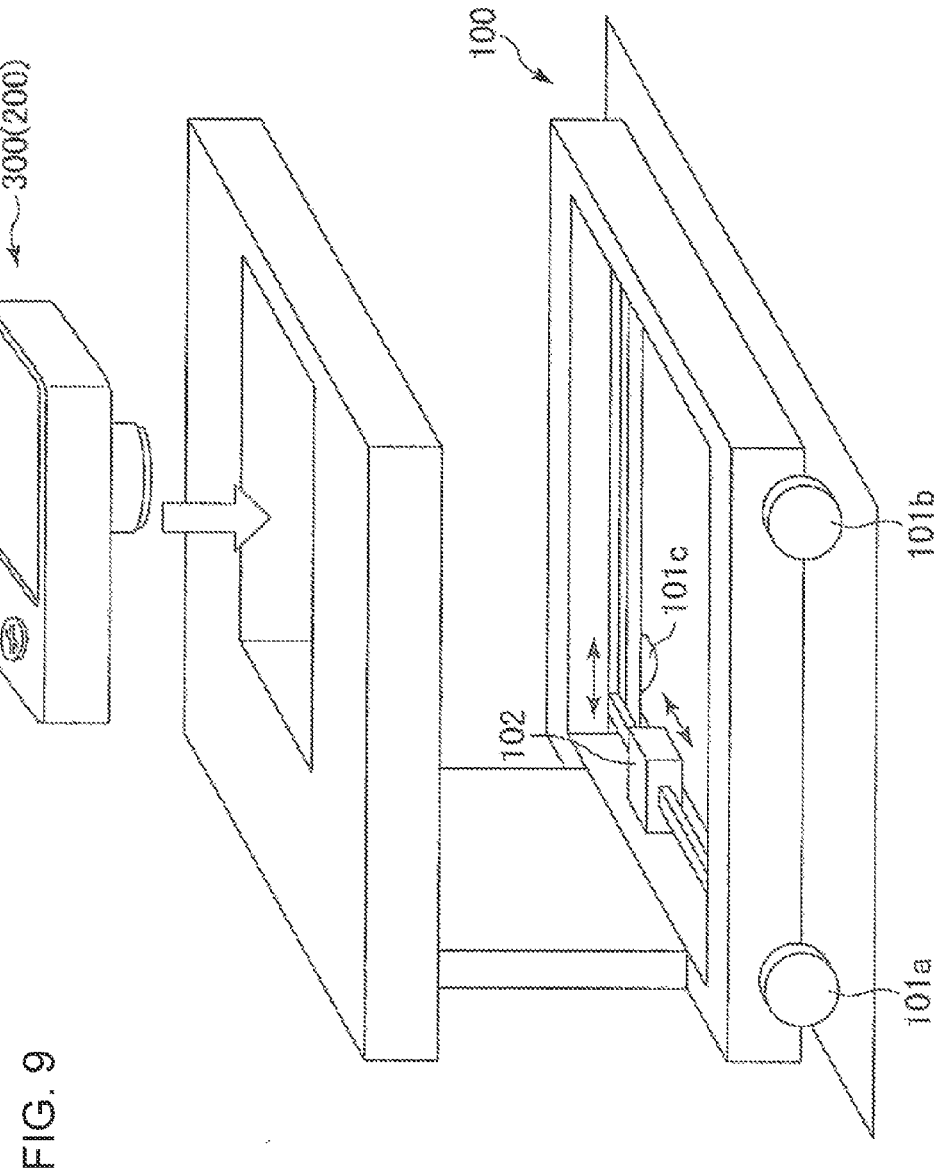
FIG. 9 is a schematic diagram of a self-propelled printing apparatus of a second embodiment of the invention.

In a second embodiment of the invention, as shown in FIG. 9, it is preferable that the imaging element 200 be provided in a digital camera 300, which can be attached to and detached from the self-propelled printing apparatus 100, and that the self-propelled printing apparatus 100 further include a position analysis unit that analyzes the information of a position to which the self-propelled printing apparatus 100 has been moved by the moving unit 101 and a print processing data generation unit that generates print processing data on the basis of the analysis result of the position analysis unit.

Figure 10:
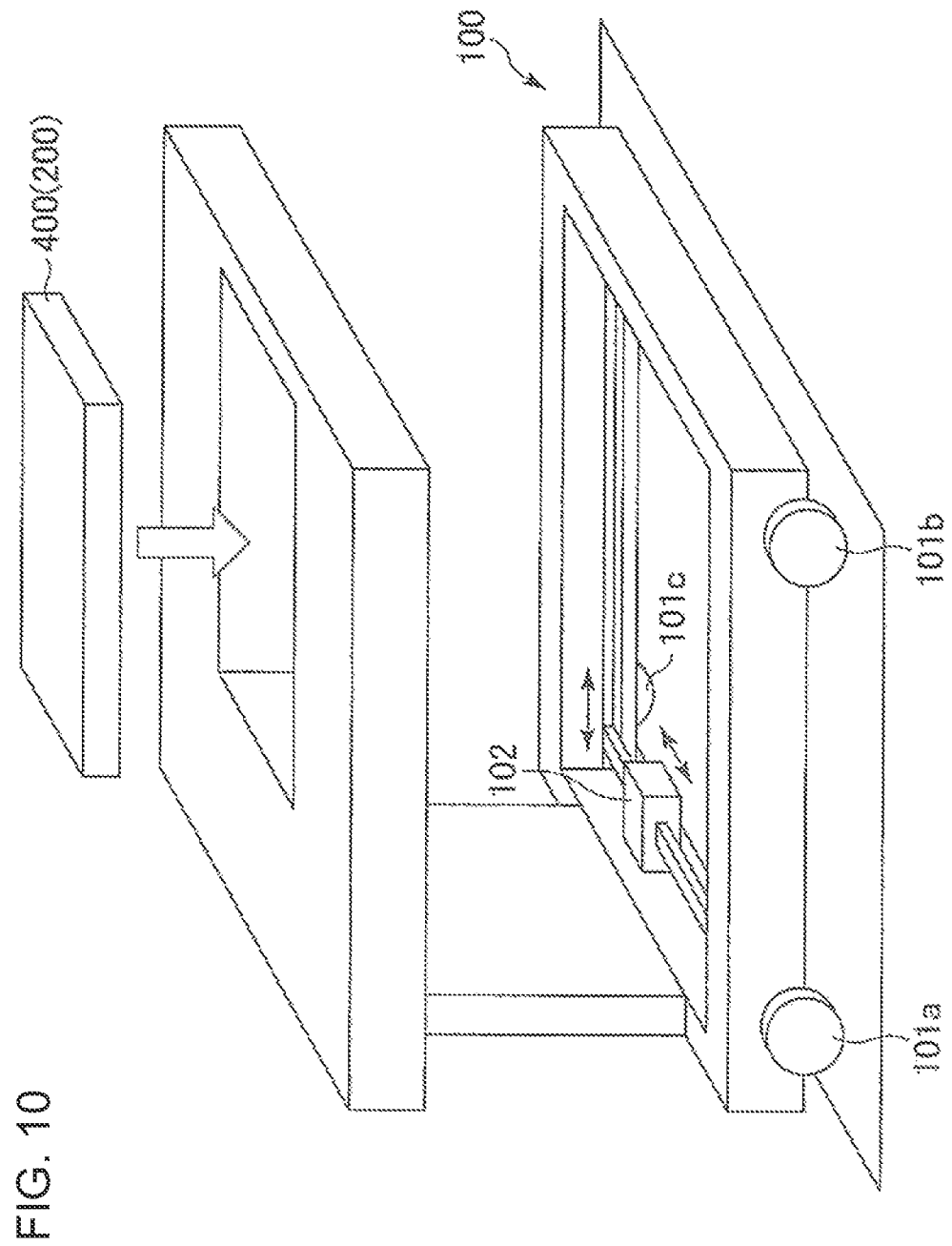
FIG. 10 is a schematic diagram of a self-propelled printing apparatus of a third embodiment of the invention.

In a third embodiment of the invention, as shown in FIG. 10, it is preferable that the imaging element 200 be provided in a mobile device 400, which can be attached to and detached from the self-propelled printing apparatus 100, and that the print processing data be generated on the basis of an analysis result of the position of the self-propelled printing apparatus 100 on the object to be printed 10 by the mobile device 400 using an image captured by the imaging element 200. The mobile device 400 refers to a smart phone or a compact computer having a camera function, for example. These are formed by integrating many functions, such as a CPU including a position analysis unit that analyzes the information of a position to which the self-propelled printing apparatus 100 has been moved by the moving unit 101 and a print processing data generation unit that generates print processing data on the basis of the analysis result of the position analysis unit, a storage device, a communication device, a display device, and a UI. In this case, a movement instruction can be given to the self-propelled printing apparatus 100 by the mobile device 400.

Figure 11:
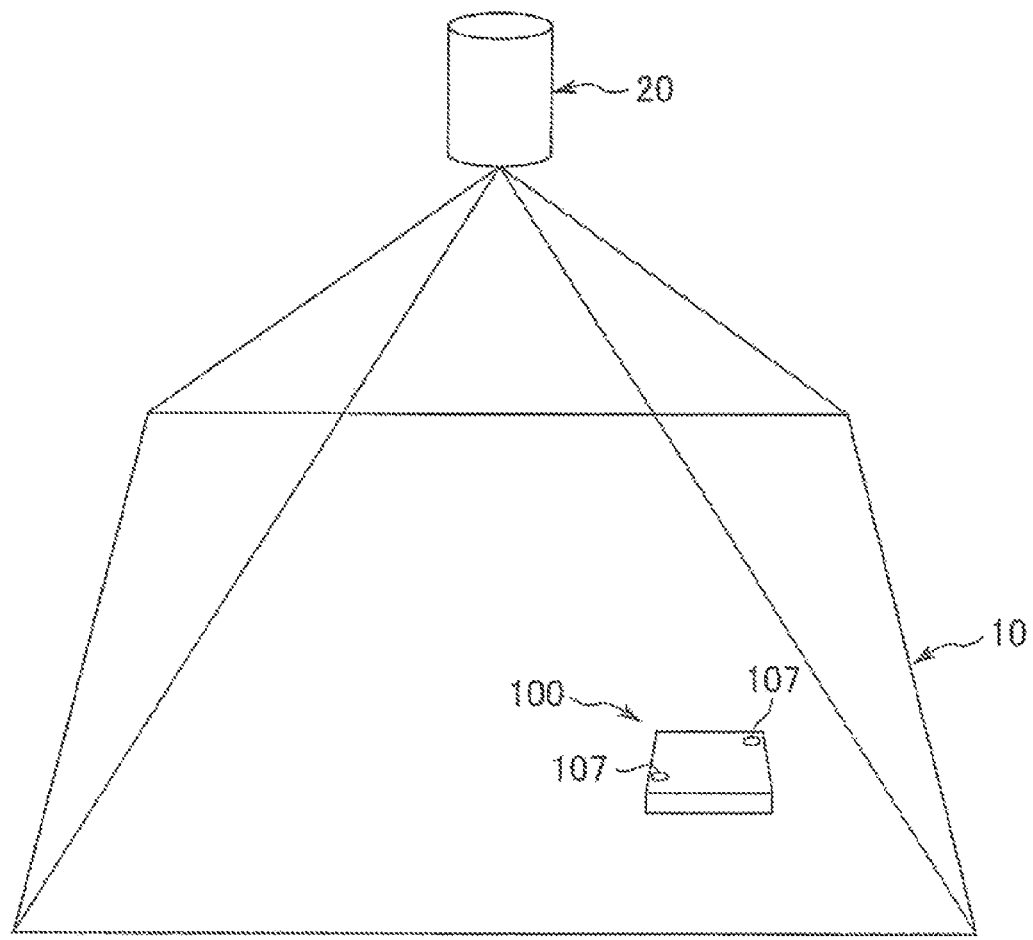
FIG. 11 is a schematic diagram of a self-propelled printing apparatus of a fourth embodiment of the invention.

In addition, as shown in FIG. 11, in a fourth embodiment of the invention, it is preferable that the self-propelled printing apparatus 100 further include an optical sensor 107 which detects light of a position information pattern projected by one or more projection means 20 and that the position information be obtained by analyzing the light detection result of the optical sensor 107.

It is preferable that the position information pattern be a time-varying pattern depending on a location. As examples of the time-varying pattern depending on a location, a pattern having a different blinking cycle for each fixed range, a pattern that moves continuously or is deformed, and the like may be mentioned.

It is preferable that the position information pattern be a pattern of light having different characteristics depending on a location. As examples of the pattern of light having different characteristics depending on a location, a pattern having a different light wavelength for each fixed range, a pattern having a different light intensity for each fixed range, and the like may be mentioned.

In the first to fourth embodiments of the invention, it is preferable that, when the position information pattern projected by the projection means is distorted, the print processing data be generated with the correction of the distortion.

Figure 12A:
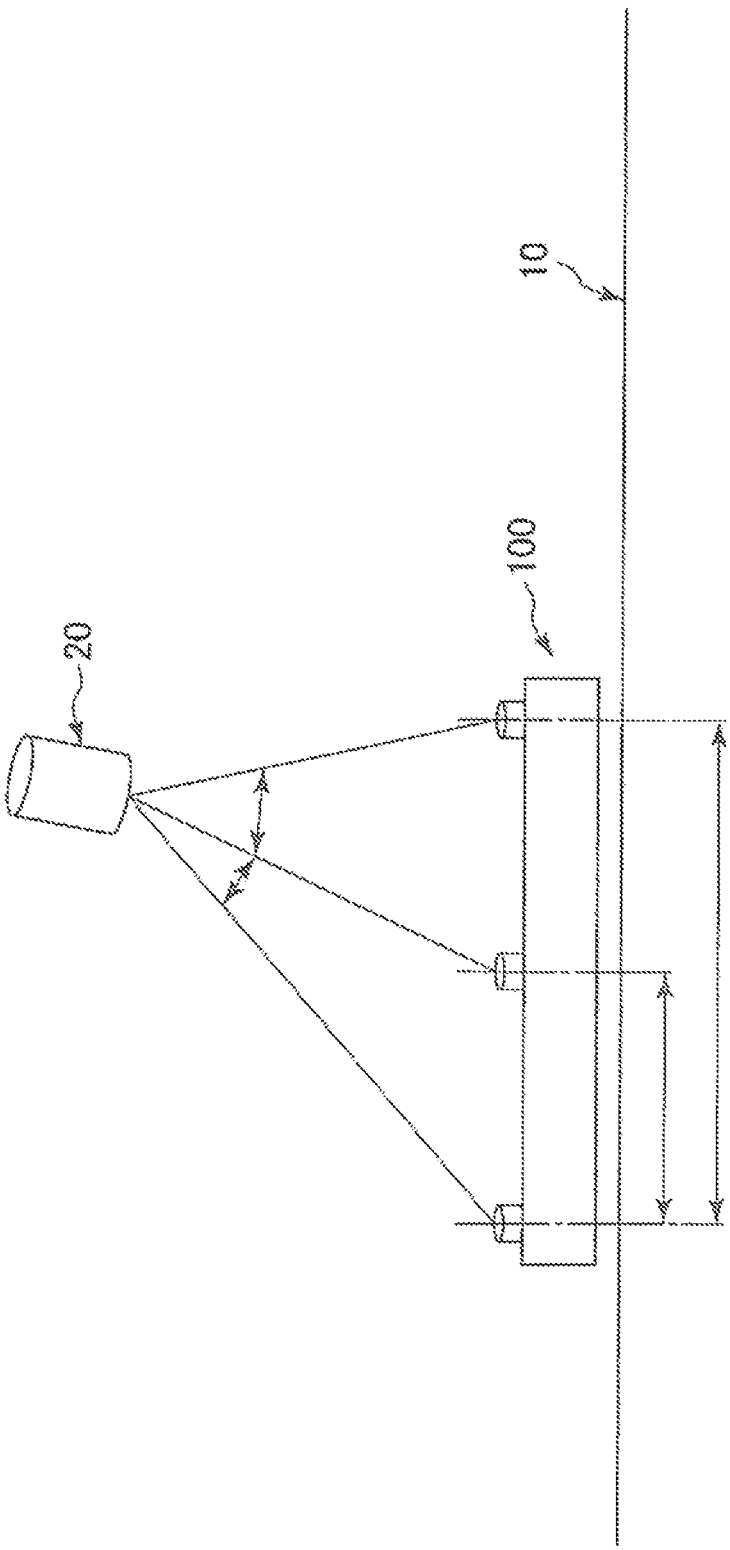
FIGS. 12A and 12B are diagrams showing examples of distortion of the position information pattern of the invention.
Figure 12B:
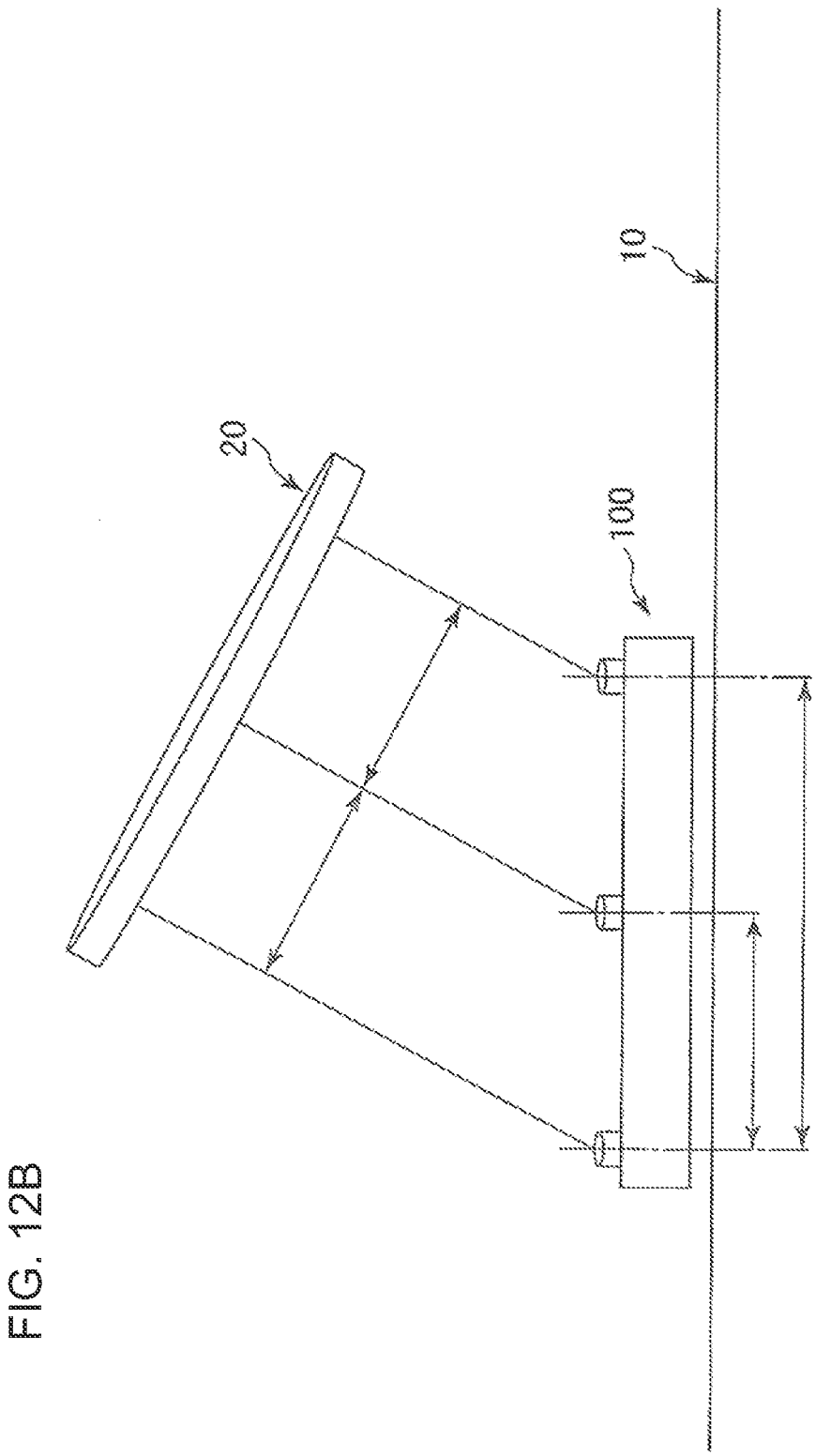

FIGS. 12A and 12B are diagrams showing cases where the position information pattern is distorted. FIG. 12A shows a case where the projection means 20 is a point light source. In this case, the position or the angle of the projection means 20 can be obtained by imaging the indicator of the apparatus and the projection pattern simultaneously and combining this information and prior information (such as the angle between gratings) of the projection pattern. FIG. 12B shows a case where the projection means 20 is a surface light source, and the position or the angle of a projection source can be obtained in the same manner as in FIG. 12A.

Figure 13:
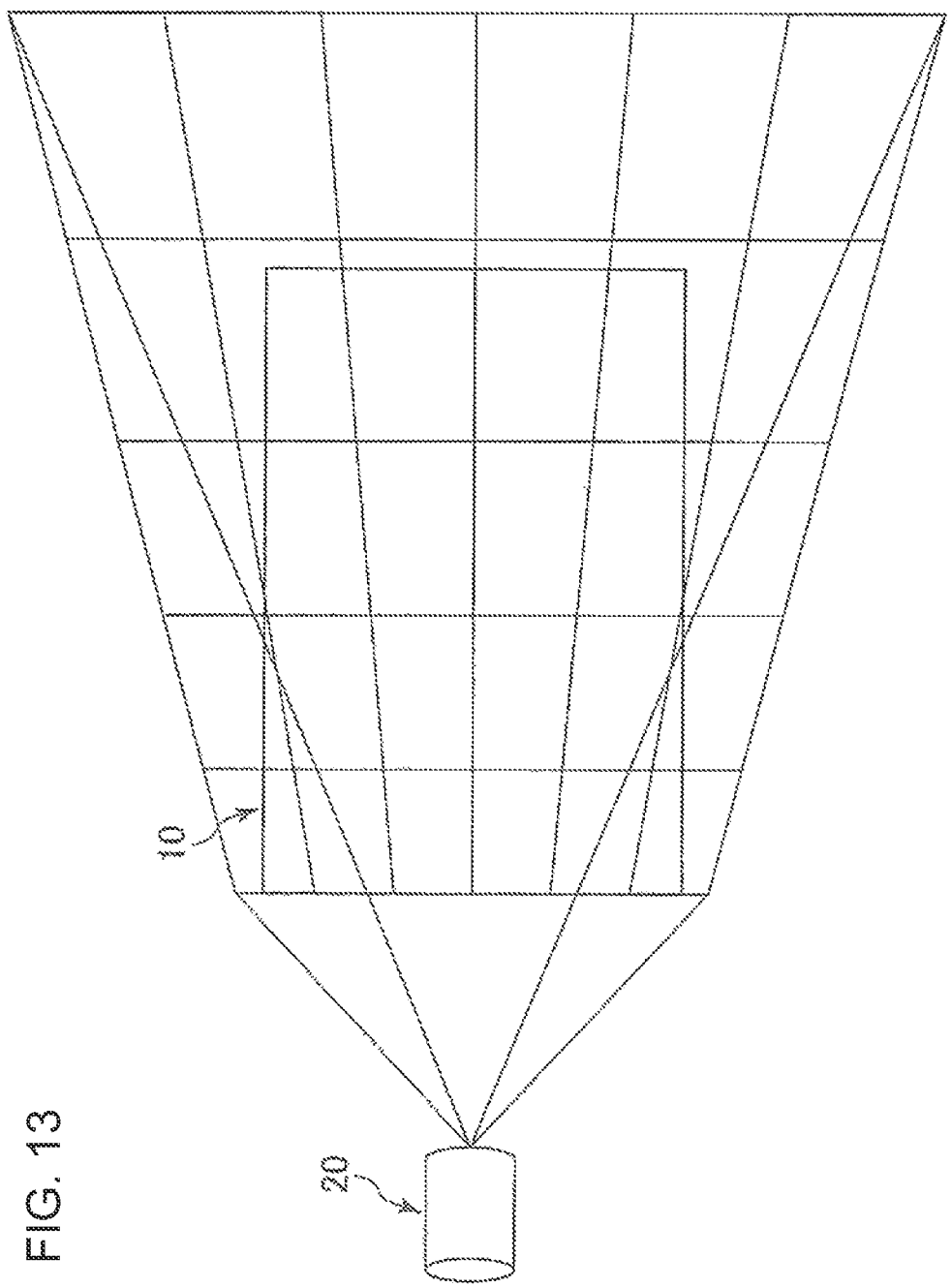
FIG. 13 is a diagram showing an example of the position information pattern of the invention.

In addition, as shown in FIG. 13, by making one side of the position information pattern include one side of the object to be printed and matching the midpoint of one side of the position information pattern with the midpoint of one side of the object to be printed, print contents can be printed at the expected position in the object to be printed. That is, by performing such alignment, it is possible to prevent the occurrence of a situation where print contents become oblique to the paper or print contents go too far upward to cause a lopsided margin (or some of the print contents are missing).

While the case where the position information is obtained using an optical method has been described, the position information may also be obtained using a magnetic method, an electromagnetic method, or a surveying method as a modification.

The magnetic method is a method of recognizing the position of an apparatus by generating a gradient magnetic field (magnetic field whose intensity changes continuously with a position) from the outside so that the entire document falls within the gradient magnetic field and making the apparatus measure the magnetic field intensity at its position. In addition, the electromagnetic method is a method of recognizing the position of an apparatus-side coil by embedding a plurality of coils as an array inside the pedestal on which a document is placed and also embedding coils in the apparatus, causing electromagnetic induction using these coils, and measuring the electromotive force by the coils.

In cases when using the surveying method, it is preferable that the self-propelled printing apparatus further include a radio wave detection unit that detects radio waves emitted from a plurality of reference positions and that the position information be obtained by analyzing a radio wave detection result of the radio wave detection unit.

In addition, it is preferable that the self-propelled printing apparatus further include an ultrasonic wave detection unit that detects ultrasonic waves emitted from a plurality of reference positions and that the position information be obtained by analyzing an ultrasonic wave detection result of the ultrasonic wave detection unit.

In addition, in the self-propelled printing apparatus of the invention, printing includes not only planar printing but also three-dimensional printing. As examples of three-dimensional printing, a method of pasting dissolved materials, a method of spraying (printing) an adhesive after sprinkling powder thinly and uniformly, and a method of performing the printing of color and cutting each time a piece of paper is pasted while stacking the paper may be mentioned.

In addition, a plurality of self-propelled printing apparatuses of the invention may be simultaneously used to increase the printing speed. In this case, it is preferable that the plurality of apparatuses have a function to communicate with each other. This is effective when the size of an object to be printed is large.

In addition, although the self-propelled printing apparatus of the invention performs printing on the object to be printed, for example, the printing unit of the present invention may replace a processing unit that performs processing, such as painting, heap-up painting, cutting, heating, or chemical change, for an object. In this case, the self-propelled printing apparatus of the invention can be used as a self-propelled processing apparatus that performs the above-described processing for an object.

In addition, it is possible to adopt a configuration in which a refueling station required for printing (or processing), such as ink, an ink cartridge, and a processing material, is placed outside and an apparatus moves to the refueling station when necessary in order to perform automatic replenishment. In addition, similarly, it is also possible to adopt a configuration in which a charging station is placed outside and an apparatus moves to the charging station when necessary in order to perform automatic charging.

An object to be printed may be transported from the external location by an apparatus when necessary. In addition, an object after printing may be transported to the external location. In this manner, for example, printing of a plurality of pages can be performed in a completely automatic manner.

In addition, it is also possible to configure a 3D scanner or a stereo imaging system by providing a camera for imaging an object separately from or for common use with a camera for position recognition so that an object is imaged at a plurality of positions and the results are recorded together with the recognized positions. Similarly, it is also possible to image the landscape and synthesize a wide-angle photograph, such as a panoramic photograph.

In addition, it is also possible to record the imaging position of an object and return to the recording position later. For example, by storing the imaging position of the face of a participant A, it is possible to return to the imaging position of the participant A even after moving a camera to a participant B. Therefore, this can be used in a video conference system and the like.

It is also possible to provide a radiation device (of light beams, heat rays, electromagnetic waves, radiation, and the like) and perform radiation with respect to an object at the optimal angle, time, distance, and line type (frequency, lamp voltage, and the like) "determined on the basis of the recognized position".

An apparatus may be configured to have a print function and a scan function (2D or 3D) so as to perform scanning before printing. For example, in the case of 2D, a part that has already been printed is finished without further printing. In addition, in the case of 3D, for example, a portion that is already heaped up is not heaped up any more, and only a portion that has not been heaped up yet is heaped up. In this scan function, an image captured by the above-described imaging element may be used as a scan image, or a scan image may be obtained by placing a scanning unit adjacent to the printing unit and moving this scanning unit together with the printing unit.

The self-propelled printing apparatus of the invention is not limited to having a configuration to perform printing on a horizontal surface, but may be configured to be able to perform printing on a vertical or curved surface. For example, the self-propelled printing apparatus of the invention may print a mural or the like.

In addition, although the self-propelled printing apparatus of the invention performs printing on an object to be printed, the self-propelled printing apparatus of the invention may be used as a self-propelled scanning apparatus by replacing the printing unit of the invention with a scanning unit that scans an object, for example. In this case, in addition to scanning the paper document, it is also possible to perform non-destructive inspection of buildings or the like using a mechanism that can move vertically on the wall surface, for example.

As a specific configuration example, a main body is formed by providing a self-propelled mechanism to a compact scan unit with a scan area of about 5 square centimeters, and a mobile device is mounted in the main body. Meanwhile a transparent plate (such as an underlay) with a position recognition pattern is placed on a document. When the main body is placed on the transparent plate, a scan image of the entire document is obtained by performing multiple scans throughout all over the document with position recognition while performing self-propelling and finally connecting these images to each other. Position recognition can be realized not only by the same method as in this application, such as performing imaging with a camera of a mobile device but also by analyzing an image obtained by the compact scan unit.

Figure 14:
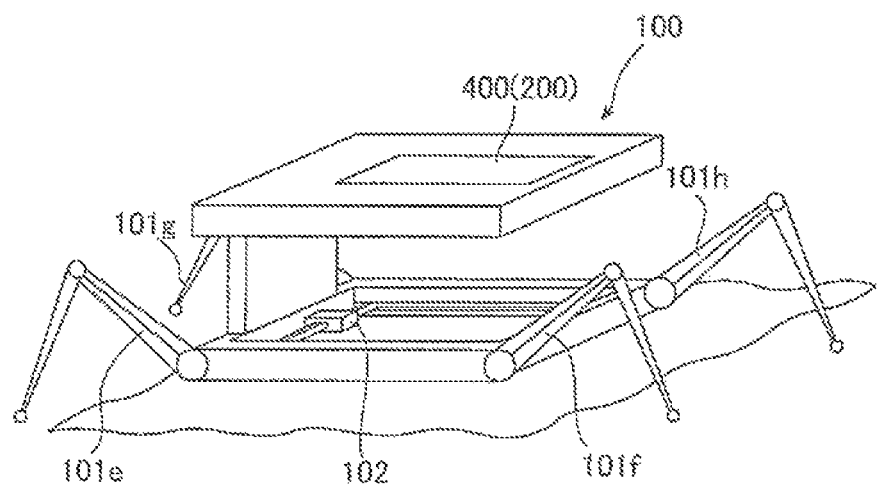
FIG. 14 is a schematic diagram showing a modification of the self-propelled printing apparatus of the invention.

In addition, the moving unit 101 of the self-propelled printing apparatus of the invention may be configured to be leg sections 101*e* to 101*h* as shown in FIG. 14 so that quadruped locomotion is possible.

A printing system of the invention is a printing system to perform printing on an object to be printed, and includes a moving unit that moves a self-propelled printing apparatus on the object to be printed, a position analysis unit that analyzes information of a position to which the self-propelled printing apparatus has been moved by the moving unit, a print processing data generation unit that generates print processing data on the basis of an analysis result of the position analysis unit, and a printing unit that performs printing on the object to be printed on the basis of the print processing data generated by the print processing data generation unit. Details of each unit are the same as described above.

A printing method of the invention is a printing method for performing printing on an object to be printed, and includes a movement step of moving a self-propelled printing apparatus on the object to be printed, a position analysis step of analyzing information of a position to which the self-propelled printing apparatus has been moved in the movement step, a print processing data generation step of generating print processing data on the basis of an analysis result in the position analysis step, and a printing step of performing printing on the object to be printed on the basis of the print processing data generated in the print processing data generation step. Details of each step are the same as described above.

A printing program of the invention is a printing program for performing printing on an object to be printed, and causes a computer to realize a movement function of moving a self-propelled printing apparatus on the object to be printed, a position analysis function of analyzing information of a position to which the self-propelled printing apparatus has been moved by the movement function, a print processing data generation function of generating print processing data on the basis of an analysis result by the position analysis function, and a printing function of performing printing on the object to be printed on the basis of the print processing data generated by the print processing data generation function. Details of each function are the same as described above.

According to the invention, it is possible to provide a printing apparatus capable of moving on an object to be printed to perform printing on the object to be printed without degrading the quality of printing, a printing system including the self-propelled printing apparatus, a printing method using the self-propelled printing apparatus, and a printing program for using the self-propelled printing apparatus.

What is claimed is:

1. A self-propelled printing apparatus to perform printing on an object to be printed, comprising:
   a moving unit that moves the self-propelled printing apparatus on the object to be printed; and
   a printing unit that performs printing on the object to be printed on the basis of print processing data generated based on information of a position to which the self-propelled printing apparatus has been moved by the moving unit,
   wherein the position information is obtained by analyzing an image captured by an imaging element, and
   wherein the imaging element images a position information pattern projected by one or more projection means.

2. The self-propelled printing apparatus according to claim 1,
   wherein the imaging element images the position information pattern fixed on the object to be printed.

3. The self-propelled printing apparatus according to claim 2, further comprising:
   an indicator that indicates a range to be printed,
   wherein the imaging element images the position information pattern and the indicator.

4. The self-propelled printing apparatus according to claim 2,
   wherein the position information pattern is a grid-like pattern.

5. The self-propelled printing apparatus according to claim 1,
   wherein the position information pattern is projected onto the object to be printed.

6. The self-propelled printing apparatus according to claim 1, further comprising:
   an indicator that indicates a range to be printed,
   wherein the imaging element images the position information pattern and the indicator.

7. The self-propelled printing apparatus according to claim 6,
   wherein, when the position information pattern projected by the projection means is distorted, the print processing data is generated with the correction of the distortion.

8. The self-propelled printing apparatus according to claim 1, further comprising:
   a screen unit onto which the position information pattern is projected,
   wherein the imaging element images the position information pattern projected onto the screen unit.

9. The self-propelled printing apparatus according to claim 8, further comprising:
   an indicator that indicates a range to be printed,
   wherein the imaging element images the position information pattern and the indicator.

10. The self-propelled printing apparatus according to claim 9,
    wherein the indicator is integrated in the screen unit.

11. The self-propelled printing apparatus according to claim 10,
    wherein, when the position information pattern projected by the projection means is distorted, the print processing data is generated with the correction of the distortion.

12. The self-propelled printing apparatus according to claim 9,
    wherein, when the position information pattern projected by the projection means is distorted, the print processing data is generated with the correction of the distortion.

13. The self-propelled printing apparatus according to claim 1, further comprising:
    an imaging unit in which the imaging element is provided;
    a position analysis unit that analyzes the information of a position to which the self-propelled printing apparatus has been moved by the moving unit; and
    a print processing data generation unit that generates the print processing data on the basis of an analysis result of the position analysis unit.

14. The self-propelled printing apparatus according to claim 1, further comprising:
    a position analysis unit that analyzes the information of a position to which the self-propelled printing apparatus has been moved by the moving unit; and
    a print processing data generation unit that generates the print processing data on the basis of an analysis result of the position analysis unit,
    wherein the imaging element is provided in a digital camera that can be attached to and detached from the self-propelled printing apparatus.

15. The self-propelled printing apparatus according to claim 1,
wherein the imaging element is provided in a mobile device that can be attached to and detached from the self-propelled printing apparatus, and
the print processing data is generated on the basis of an analysis result of a position of the self-propelled printing apparatus on the object to be printed by the mobile device using an image captured by the imaging element.

16. The self-propelled printing apparatus according to claim 1,
wherein the self-propelled printing apparatus further has a function of scanning the object to be printed.

17. The self-propelled printing apparatus according to claim 1,
wherein the position information pattern is a grid-like pattern.

18. A self-propelled printing apparatus to perform printing on an object to be printed, comprising:
a moving unit that moves the self-propelled printing apparatus on the object to be printed;
a printing unit that performs printing on the object to be printed on the basis of print processing data generated based on information of a position to which the self-propelled printing apparatus has been moved by the moving unit; and
an optical sensor that detects light of a position information pattern projected by one or more projection means,
wherein the position information is obtained by analyzing the light detection result of the optical sensor.

19. The self-propelled printing apparatus according to claim 18,
wherein the position information pattern is a time-varying pattern depending on a location.

20. The self-propelled printing apparatus according to claim 18,
wherein the position information pattern is a pattern of light having different characteristics depending on a location.

21. The self-propelled printing apparatus according to claim 18,
wherein, when the position information pattern projected by the projection means is distorted, the print processing data is generated with the correction of the distortion.

22. A self-propelled printing apparatus to perform printing on an object to be printed, comprising:
a moving unit that moves the self-propelled printing apparatus on the object to be printed; and
a printing unit that performs printing on the object to be printed on the basis of print processing data generated based on information of a position to which the self-propelled printing apparatus has been moved by the moving unit;
wherein the position information is obtained using a surveying method.

23. The self-propelled printing apparatus according to claim 22, further comprising:
a radio wave detection unit that detects radio waves emitted from a plurality of reference positions,
wherein the position information is obtained by analyzing the radio wave detection result of the radio wave detection unit.

24. The self-propelled printing apparatus according to claim 22, further comprising:
an ultrasonic wave detection unit that detects ultrasonic waves emitted from a plurality of reference positions,
wherein the position information is obtained by analyzing the ultrasonic wave detection result of the ultrasonic wave detection unit.

25. A printing system to perform printing on an object to be printed, comprising:
a moving unit that moves a self-propelled printing apparatus on the object to be printed;
a position analysis unit that analyzes information of a position to which the self-propelled printing apparatus has been moved by the moving unit, wherein the position information is obtained by analyzing an image captured by an imaging element, and wherein the imaging element images a position information pattern projected by one or more projection means;
a print processing data generation unit that generates print processing data on the basis of an analysis result of the position analysis unit; and
a printing unit that performs printing on the object to be printed on the basis of the print processing data generated by the print processing data generation unit.

26. A printing method for performing printing on an object to be printed, comprising:
a movement step of moving a self-propelled printing apparatus on the object to be printed;
a position analysis step of analyzing information of a position to which the set-propelled printing apparatus has been moved in the movement step, wherein the position information is obtained by analyzing an image captured by an imaging element, and wherein the imaging element images a position information patter projected by one or more projection means;
a print processing data generation step of generating print processing data on the basis of an analysis result in the position analysis step; and
a printing step of performing printing on the object to be printed on the basis of the print processing data generated in the print processing data generation step.

* * * * *